US008204321B2

(12) United States Patent
Rossato et al.

(10) Patent No.: US 8,204,321 B2
(45) Date of Patent: Jun. 19, 2012

(54) METHOD AND APPARATUS FOR DIGITAL IMAGE CODING

(75) Inventors: Luca Rossato, Milan (IT); Andrea Varesio, Turin (IT)

(73) Assignee: Telecom Italia S.p.A., Milan (IT)

( * ) Notice: Subject to any disclaimer, the term of this patent is extended or adjusted under 35 U.S.C. 154(b) by 809 days.

(21) Appl. No.: 11/918,903

(22) PCT Filed: Apr. 19, 2005

(86) PCT No.: PCT/EP2005/004167
§ 371 (c)(1),
(2), (4) Date: Feb. 2, 2009

(87) PCT Pub. No.: WO2006/111179
PCT Pub. Date: Oct. 26, 2006

(65) Prior Publication Data
US 2009/0202164 A1    Aug. 13, 2009

(51) Int. Cl.
*G06K 9/36* (2006.01)
(52) U.S. Cl. ............... 382/238; 382/251; 375/240.16; 375/240.24; 375/240.13
(58) Field of Classification Search .................. None
See application file for complete search history.

(56) References Cited

U.S. PATENT DOCUMENTS

| 6,473,529 B1 | 10/2002 | Lin | |
|---|---|---|---|
| 2007/0274396 A1* | 11/2007 | Zhang et al. | 375/240.24 |
| 2008/0002770 A1* | 1/2008 | Ugur et al. | 375/240.16 |

FOREIGN PATENT DOCUMENTS

| EP | 0 951 181 A1 | 10/1999 |
|---|---|---|
| EP | 1 503 596 A2 | 2/2005 |
| WO | WO 2004/056125 A1 | 12/2003 |

OTHER PUBLICATIONS

Xuan, et al., "Method for detecting all-zero DCT coefficients ahead of discrete cosine transformation and quantisation", Electronics Letters, IEE Steveanage, GB, vol. 34, No. 19, pp. 1839-1840, (Sep. 17, 1998).
Kim, et al., "Fast H.264 Intra-Prediction Mode Selection Using Joint Spatial and Transform Domain Features", XP-002346909, retrieved from the Internet: http://www-scf.usc.edu/{changsuk/Publications/JVC104.pdf, pp. 1-20, (Apr. 25, 2004).
Puri, et al., "Video coding using the H.264/MPEG-4 AVC compression standard", Signal Processing: Image Communication, vol. 19, No. 9, pp. 793-849, (Oct. 2004).

* cited by examiner

*Primary Examiner* — Claire X Wang
*Assistant Examiner* — Siamak Harandi
(74) *Attorney, Agent, or Firm* — Finnegan, Henderson, Farabow, Garrett & Dunner, L.L.P.

(57) ABSTRACT

A method of coding a digital image includes subdividing the image into image blocks formed by a plurality of pixels, and processing each image block of the image, by determining a skip-mode prediction block in respect of the current image block being processed, calculating a difference between the image block being processed and the skip-mode prediction block, and comparing the calculated difference to a predetermined threshold. The calculation of the difference between the current image block being processed and the skip-mode prediction block includes: calculating a plurality of pixel-by-pixel differences between a pixel of the current image block and a corresponding pixel of the skip-mode prediction image block; associating a respective quantized value with each pixel-by-pixel difference; and cumulating the quantized values.

41 Claims, 6 Drawing Sheets

FRAME 0

```
XXXXXXXXXXXXXXXXXXXXXX    XXXXXXXXXXXXXXXXXXXXXX
XXXXXXXXXXXXXXXXXXXXXX    XXXXXXXXXXXXXXXXXXXXXX
XXXXXXXX···XXXXXXXXXXX    XXXXXXXX···XXXXXXXXXX
XXXXXXXX···XXXXXXXXXXX    XXXXXXX·······XXXXXXXX
XXXXXXX·XXX·XXXXXXXXXX    XXXXXXX·XXX·XXXXXXXXXX
XXXXX·XX·XXXXXXXXXXXXX    XXXXXX·XXXXXXXXXXXXXXX
XXXXXXX······XXXXXXXXX    XXXXXXX······XX·XXXXXX
XXXXXXX······XXXXXXXXX    XXXXXXX······XXXXXXXXX
XXXX·XX·····X·XXXXXXXX    XXXXX·X·····X·X··XXXXX
XXXXXXXX····XXXX·XXXXX    XXXXXX·X···XXXXX·XXXXX
XXXX·XXX···XXX··XXXXXX    XXXX·X·X····XX··XXXXXX
XXXXXXX·X·XXXX··X·XXXX    XXXXX·XXXXXXX····XXXXX
XXXXXXXXX·X···XXXXXXX     XXXX··XXXXXXX··XXXXXX
XXXXXXXXXXXXX·XXXXXXX     XXXXXXX·XXXX·X·XX·XXXX
XXXX··XXXXXXXXXXXXXXXX    XX······XXXXXXXXXXXXXX
X·XXXXXXXXXXXXXXXXXXXX    XX··XX·XXXXXXXXXXXXXXX
XXX·XXXX·XXX·XXXXXXXXX    X·····XX··X··XXX····XX
XXX·XXXXX·X·XXXXXXXXXX    X·····XX······XX···XXX
```

FRAME 1

```
XXXXXXXXXXXXXXXXXXXXXX    XXXXXXXXXXXXXXXXXXXXXX
XXXXXXXXXXXXXXXXXXXXXX    XXXXXXXXXXXXXXXXXXXXXX
XXXXXXXX·····XXXXXXXXX    XXXXXXXX····XXXXXXXXX
XXXXXXX··X···XXXXXXXXX    XXXXXXX·······XXXXXXXX
XXXXXX·XXX·XX·XXXXXXXX    XXXXXX·XXX·XXXXXXXXXX
XXXXX·X·X·X·XX·XXXXXXX    XXXXXX·XX··X·X·XXXXXXX
XXXXX········X·XXXXXXX    XXXXXX·······XX·XXXXXX
XXXXX········XX·XXXXXX    XXXXX········XX·XXXXXX
XXXXXX···X····XX·XXXXX    XXXXXXX··X····X··XXXXX
XXXXXX·X······XXXXXXXX    XXXX·X·X·····X···XXXXX
XXXXX·······XXX··XXXXX    XXXX········XX·X·XXXXX
XXXX·XX·XX·X··XX··XXXX    XXXX··X·X·XXXX····XXXX
XXXXX·X·XXX·X·XXXXXXXX    XXXXX·XXXXXX··XXXXXXXX
XX···XXXX·XXXX··XXXXXX    XX···XX·XXXX·X·XX·XXXX
XX·XXXXX·X·XX·XX·XXXXX    XX······XXXXX·XXXXXXXX
X··XXXXXX·XXXXX··XXXXX    X····X·X·XXX·XX··XXXXX
X···XXXX··X····XXXXXXX    X·····XX··X··XX·····XX
X····XXX······X·XXXXXX    X······X······X······XX
```

FIG. 5
(1st of 2)

```
                              FRAME 2
        XXXXXXXXXXXXXXXXXXXXX          XXXXXXXXXXXXXXXXXXXXX
        XXXXXXXXX··XXXXXXXXXX          XXXXXXXXXXXXXXXXXXXXX
        XXXXXXXX·····XXXXXXXX          XXXXXXX·····XXXXXXXXX
        XXXXXX······X··XXXXXXX         XXXXXXX······XXXXXXXX
        XXXXX··XXX····XXXXXXX          XXXXX··XX·X·X·XXXXXXX
        XXXXX·XX··XX···XXXXXX          XXXX··XX··XX···XXXXXX
        XXXXXX·······X··XXXXXX         XXXX····X···X··XXXXXX
        XXXX·········X···XXXXX         XXXX········XX··XXXXX
        XXXXXX···········XXXXXX        XXXXXX·······XX·XXXXXX
        XXXXX········X·X··XXXXX        XXX···X····X·X··XXXXX
        XXXX·········XX··XXXX          XXXX·············XXXXX
        XXXX··X·X·X··XXX·XXXXX         XXXX····XX·X·X·X··XXXX
        XXX··X···X····X···XXXX         XXXX····XXX··XXXX·XXXX
        XX··X···XXX·····XXXXXX         XXX······XXX···XX·XXXX
        X·X··X···X·XXX··XXXXXX         XX······XXXXX·X··XXXXX
        ····X·X····XXX··XXXXX          X······XX·XX·X····XXXX
        ···XXXXX··XX··X··XXXXX         X··········XX·········XX
        X····XX············XXXX        X·····X·············XX

FRAME 3
        XXXXXXXXXXXXXXXXXXXXX          XXXXXXXXXXXXXXXXXXXXX
        XXXXXXXXX··XXXXXXXXXX          XXXXXXXXX··XXXXXXXXXX
        XXXXXXX······XXXXXXXX          XXXXXXXX·····XXXXXXXX
        XXXXXXX······XXXXXXXX          XXXXXXX······XXXXXXXX
        XXXXXXX·X····X·XXXXXXX         XXXXXX··X······XXXXXXX
        XXXXXX··X·····X·XXXXXX         XXXXXX·X··XX···XXXXXX
        XXXX···········XXXXX           XXXXX··········XXXXXX
        XXXX·············XXXXX         XXXXXX··········XXXXX
        XXXXX············XXXXXX        XXXXX············XXXXX
        XXXX·············XXXXX         XXXX········X·····XXXXX
        XXXX·············XXXX          XXXX········X······XXXX
        XXX·X············XXXXX         XXXX·············XXXXX
        XXXX·X····X····XXXXXXX         XXXX·····XX····XXXXXXX
        XX··XXX··X·X···X·XXXXX         XX····X··X·XXX···XXXX
        X·XXX···XX··XX····XXXX         X··X·····X·X··X··XXXXX
        X······X·····X····XXXX         X·····X······X····XXXX
        X··XXXX··X···XX··XXXXX         X······X·····XX·····XX
        X···············X·XXX          X··············X·····XX
```

FIG. 5
(2nd of 2)

METHOD AND APPARATUS FOR DIGITAL IMAGE CODING

CROSS REFERENCE TO RELATED APPLICATION

This application is a national phase application based on PCT/EP2005/004167, filed Apr. 19, 2005, the content of which is incorporated herein by reference.

FIELD OF THE INVENTION

The present invention generally relates to the field of digital signal processing, particularly to the processing of digital images, particularly digital video, e.g. for digital video transmission in telecommunication systems. More specifically, the invention relates to digital-video coding methods and apparatuses.

BACKGROUND OF THE INVENTION

The diffusion of multimediality is more and more driving modern communications to include video as a part of the exchanged information. For example, new communications network architectures and services have been and are constantly being deployed to add video content to conventional, voice telephone calls, both in wired and in wireless, mobile communications. This is for example the case of third-generation (3G) cellular telephony networks, but efforts are also being made to make videotelephony become the standard in fixed, wired telephony networks (the so-called Public Switched Telephone Networks—PSTNs).

Multimediality, and, in particular, video contents are also being exploited more and more in applications for personal computers, e.g. in video games, and in consumer electronics, such as in cameras.

The diffusion of video in all these (and many others, including broadcast television) applications has been made possible by the introduction of digital video, according to which a generic picture or image (throughout the present description these two terms will be regarded as synonyms and are to be intended as interchangeable), for example, a frame/field of a video sequence, is subdivided into a finite number of "picture elements" (or "pixels"), each one corresponding to a respective small area of the image and having associated therewith (in terms of bits, i.e., strings of logic "1"s and "0"s) information about, e.g., the luminance and the chrominance of that image area.

Huge amounts of data may be required to properly describe an image (even a still one, not to say a motion sequence) in terms of pixels; thus, coding schemes have been proposed that allow reducing the otherwise not practically manageable amount of information to be transferred/stored for communicating/saving a video sequence.

Reducing as much as possible the amount of data to be handled (transferred over a transmission channel or stored in a storage device) is of paramount importance, because the capacity of the transmission channel and/or of the storage device used for delivering/storing the video is usually limited, and has an intrinsic cost. However, the reduction of the amount of bits to be transmitted/stored should impact as less as possible the quality (measured and perceived by the users) of the video once it is reconstructed (decoded) for being enjoyed.

In particular, a class of digital-video coding schemes (sometimes referred to as "block-coding schemes"), that allows to keep the amount of data to be transferred reasonably low, calls for dividing a generic image frame or field (like a picture of a video sequence) into a plurality of image blocks, each image block including a subset of the pixels of the overall image (for example, an 8×8 or 16×16 pixels matrix); the image blocks are then each one processed adopting compression techniques. Exemplary coding schemes of this kind are known under the name of H.264, MPEG4-10 or AVC (Advanced Video Coding).

In the above-cited video coding algorithms, a substantial reduction of the amount of data to be handled is achieved by means of the so-called "differential coding" technique: the generic image block under consideration is compared with other image blocks (referred to as "prediction image blocks"), which, using suitable prediction techniques, may be derived from the same image frame/field (so-called "intra" coding mode) or from previously-transmitted image frames/fields, modified by motion-compensation techniques (so-called "inter" coding mode). The difference between the image block under consideration and the generic prediction image block is then typically transformed into the spatial-frequency domain (using transform functions like the Discrete Cosine Transform—DCT), scaled and quantized, and finally converted into binary data (a string of bits), adopting a so-called "entropic coding". Among the different prediction image blocks, the one involving the best trade-off of amount of data to be transmitted/stored and/or the quality of the reconstructed image is selected; the binary data corresponding to the transformed, scaled, quantized and encoded difference between the selected prediction image block and the image block under consideration are transmitted, or stored.

The compression gain, in terms of reduction of the number of bits to be handled, is achieved thanks to the entropic coding, and such a gain is higher the better the prediction (i.e., the more the prediction image block resembles the image block under consideration), and the more the scaling and quantization phases allow reducing the entropy of the image data.

The maximum gain is achieved when the prediction is so good that (at the predetermined level of quality) the image block under consideration is substantially indistinguishable from one of the prediction image blocks. In such a case, it is not necessary to transmit data indicative of the difference between the current image block and a selected prediction image block: it may be sufficient to encode and transmit the (auxiliary) information adapted to determine which is the selected prediction image block. Under the assumption that the correct prediction image block can be identified automatically in the decoding phase, it may be even not necessary to transmit the above-mentioned auxiliary information: in this case, referred to as "skip-mode coding" or, simply, "skip mode", the coding of the image block is achieved free of transmission/storing cost. The skip-mode coding is also referred to as a "zero-bit coding", since no decoding information needs to be transmitted/stored for enabling the image decoder reconstruct the image block; at most, an indication of how many consecutive image blocks have been "skipped" is sufficient to the image decoder.

Regretfully, even adopting sophisticated motion-compensation techniques, it is not always possible to find out, for any generic image block being processed, a corresponding prediction image block that allows relying on the skip mode. However, a good encoder should be capable of detecting and applying the skip mode to a high number of image blocks (possibly the maximum). This allows reserving the transmission channel/storage medium capacity to the transmission/storage of the other image blocks, for which the skip mode does not ensure acceptable results.

Ideally, a video encoder should perform, for every image block in which the image (e.g., frame of a video sequence) is subdivided, the following actions: determining all the different possible prediction image blocks in respect of the image block under processing; for each prediction image block, calculating the difference with the image block under processing, applying the transform function, then scaling/quantizing the transformed data and calculating the entropy encoding thereof, so as to establish the cost, in number of bits, associated with that prediction image block; based on the evaluated costs in respect of the different prediction image blocks, the video encoder should determine the best prediction image block, which is the one involving the minimum cost in terms of number of bits or, in more recent encoders, the prediction image block that optimizes the so-called "rate/distortion" factor (in evaluating a generic prediction image block, the quality—signal/noise factor—of the reconstructed image is also taken into consideration); the possibility of relying on the skip mode should then be evaluated, and the best prediction image block should then be compared with the result achievable adopting the skip mode (in terms of the trade-off between the number of bits to be handled, and the quality of the decoded image), so as to establish whether the skip mode implies a worsening of the image quality, and, in the affirmative case, whether the image quality worsening is acceptable at both an image local level (the quality worsening may for example cause unacceptable artifacts in the reconstruction of the video sequence) and at a global image level (tolerating a quality reduction in respect of the image block under processing may for example free more bits that may be used for transmitting/storing other image blocks, and thus the overall quality of the reconstructed image might improve).

All these operations are extremely heavy in terms of processing power, and the processing time may easily become unacceptably long. On the contrary, in practical applications the time available for searching the best prediction is usually limited, especially in real-time applications. Sometimes, typically in the case of portable, battery-powered devices, the processing has also to be limited for reasons related to the power consumption of the hardware devices implementing the encoder.

A substantial part of the processing time needed for identifying the better prediction is spent for calculating the spatial transform of the difference between the current image block and each prediction image block, scaling/quantizing the same and performing the entropic coding.

In view of this, a technique has been proposed and adopted that allows estimating the encoding cost associated with each prediction image block without the need of preliminary performing the transformation into the spatial frequency domain of the difference between the current image block and that prediction image block, the scaling/quantization and the entropic coding. Such a technique, described for example in U.S. Pat. No. 6,473,529, calls for evaluating the difference, pixel by pixel, between the image block under consideration and the generic prediction image block, and then adding the calculated pixel-by-pixel differences over all the pixels of the image block under processing. In particular, the sum of the pixel differences is calculated on the absolute value (so-called Sum of Absolute-Differences, or SAD), or on the squares (Sum of Squared Differences—SSD—or Mean Square Error—MSE) of the pixel-by-pixel differences, in order to avoid that positive and negative differences mutually cancel.

The above-mentioned technique is based on the assumption that a smaller value of the calculated SAD for a generic image block corresponds to a smaller number of bits required for encoding (the difference between the selected prediction image block and) the image block under processing.

By adopting the SAD technique, the search for the best image predictor involves the following actions: performing, on every image predictor block, the SAD calculation; based on the calculated SADs, determining the candidate prediction image block among the image prediction blocks as the one for which the corresponding calculated SAD is the lowest among the calculated SADs in respect of all the possible prediction image blocks; calculating the SAD between the image block under processing and the prediction image block corresponding to the skip-mode coding; comparing the SAD of the candidate image block with the SAD for the prediction image block corresponding to the skip-mode coding; and, depending on the outcome of this comparison (possibly weighted so as to favor the skip-mode coding, which for sure allows saving bits) establishing whether to transmit/store the (encoded difference between the selected prediction image block and the) image block under processing, or skipping it.

The adoption of the SAD technique allows reducing the required processing power, because the calculation of the spatial transform, the scaling/quantizing and the entropic coding are performed only once, after having determined the best prediction image block (and not on every prediction image block, as in the first approach discussed above). Nevertheless, it per-se does not avoid the necessity of determining all the candidate predictor image blocks for the image block under consideration, and to calculate the SADs for each one of the different candidate prediction image blocks. This operation may become rather heavy in terms of processing power: video encoders implementing this technique may spend most of the time calculating the SADs for the several candidate prediction image blocks associated with a generic image block.

A different approach is adopted in WO 2004/056125, in which the authors propose to reduce the computational complexity of video encoding by taking the decision whether to encode a region of a video frame or to skip the encoding prior to calculating whether any motion has occurred in respect of the same region in the previous frame. In one embodiment, the decision on whether to skip the encoding of a region is based on an estimate of the energy of pixel values in the region and/or on an estimate of discrete cosine transform coefficients. In a further embodiment, the decision is based on an estimate of the distortion likely to occur if the region is not encoded. The Applicant observes that the algorithms disclosed in the WO '125 patent application are based on SAD calculations.

SUMMARY OF THE INVENTION

The Applicant has found that there are cases in which applying the SAD to a generic pair of image blocks may give unreliable results; thus, basing the decision of whether or not to skip the coding of a given image block on the result of a calculated SAD may be incorrect. For example, this may be due to the presence of noise in the image under processing; such noise may for example be introduced by the CCD (Charge-Coupled Device) sensor of a videocamera used to acquire the image, or by previous coding/decoding processes performed on the image, or by the granularity of the film, in case a conventional, analog videocamera is used. The presence of noise may cause significant differences between the pixels of the image block under processing and the pixels of the prediction image block being considered: with the SAD technique, such differences add up in absolute value (or after being squared), so that the resulting SAD value may be high even if, actually, the two image blocks do not differ significantly from each other. A relatively high SAD value in respect of the predictor image block corresponding to the skip-mode coding may thus cause the encoder to decide not to use the skip mode even if, actually, it would be perfectly suitable for the image block under processing: as a result, no advantage is taken of the possibility of encoding that image block substantially free of cost.

The Applicant has tackled the general problem of improving the performance of video coding algorithms, particularly reducing the required processing power and time. In particular, the Applicant has faced the problem of how to improve the reliability of video coding algorithms which anticipate the decision of whether to skip the coding of a generic image block.

These problems are solved by a method for encoding a digital image according to a first aspect of the present invention. The method comprises
  subdividing at least a portion of the image into image blocks formed by a plurality of pixels, and
  processing each image block. The processing includes, for a generic current image block being processed:
    determining a skip-mode prediction block in respect of the current image block being processed, calculating a difference between the image block being processed and the skip-mode prediction block, comparing the calculated difference to a predetermined first threshold; and
    determining, for the current image block being processed, prediction image blocks, electing one among the determined prediction image blocks and coding a difference between the elected prediction image block and the current image block. At least one among said determining, electing, and coding is performed conditioned to a first result of said comparing the calculated difference to the first threshold Calculating a difference between the current image block being processed and the skip-mode prediction block includes:
  calculating a plurality of pixel-by-pixel differences, wherein each of said pixel-by-pixel differences is calculated between a pixel of the current image block and a corresponding pixel of the skip-mode prediction image block;
  associating a respective quantized value to each of said pixel-by-pixel differences;
  performing a combination of the quantized values so as to obtain a cumulated value representing said difference between the current image block being processed and the skip-mode prediction block.

The association of quantized values is performed such that a contribution of a first group of pixel-by-pixel differences to a second cumulated value, obtainable by performing said combination on the values of said pixel-by-pixel differences, is higher than a contribution of a corresponding first group of quantized values to said cumulated value, wherein said pixel-by-pixel differences of the first group have an absolute value lower than a second threshold.

For the purposes of the present invention, by "combination of (generic elements of a generic plurality of elements) so as to obtain a cumulated value" it has to be intended a calculation in which the cumulated value function obtained by iteratively combining one-by-one the elements of the plurality of elements is a monotonic function. A typical arithmetical operation of this kind is a sum of integers all having the same algebraic sign (including zero).

In a preferred embodiment, the method further comprises, conditioned to a second result of said comparing, skipping said coding of the current image block.

In other embodiments of the method, said associating a respective quantized value may include associating to at least said first group of pixel-by-pixel differences respective quantized values being lower, in absolute value, than said pixel-by-pixel differences of the first group, wherein said associating to at least said first group of pixel-by-pixel differences respective quantized values being lower in absolute value may include associating to each pixel-by-pixel difference of said first group a respective quantized value equal to zero, wherein said associating to each pixel-by-pixel difference of said first group a respective quantized value equal to zero may include truncating to a prescribed number of digits a numeric code representing the respective pixel-by-pixel difference absolute value, or wherein said associating to each pixel-by-pixel difference of said first group a respective quantized value equal to zero may further comprise, before truncating, multiplying the respective pixel-by-pixel difference absolute value by a predetermined constant value.

In certain embodiments of the method of the present invention, said associating a respective quantized value may include associating to a second group of pixel-by-pixel differences, having an absolute value higher than or equal to the second threshold, respective quantized values being higher, in absolute value, than said pixel-by-pixel differences of the second group;

said associating a respective quantized value may include raising each of the pixel-by-pixel differences to an even exponent, particularly to the square; or said electing one among the determined prediction image blocks may include calculating differences between the current image block being processed and the prediction image blocks, wherein said calculating differences between the current image block being processed and the prediction image blocks may include, for each generic prediction image block:
  calculating a plurality of second pixel-by-pixel differences, wherein each of said second pixel-by-pixel differences is calculated between a pixel of the current image block and a corresponding pixel of the generic prediction image block;
  processing said second pixel-by-pixel differences so as to obtain a respective plurality of processed second pixel-by-pixel difference values; and
  combining said processed second pixel-by-pixel difference values so as to obtain a third cumulated value, representing the difference between the current image block being processed and the generic prediction image block; or wherein said calculating differences between the current image block being processed and the prediction image blocks may include, for each generic prediction image block:
  calculating a plurality of second pixel-by-pixel differences, wherein each of said second pixel-by-pixel differences is calculated between a pixel of the current image block and a corresponding pixel of the generic prediction image block;
  associating a respective second quantized value to each of said second pixel-by-pixel differences; and
  performing a combination (320) of the second quantized values so as to obtain a third cumulated value (SQUAD) representing said difference between the current image block being processed and the generic prediction image block, wherein said associating a respective second quantized value may be performed such that a contribution of a first group of the second pixel-by-pixel differences to a fourth cumulated value, obtainable by performing said combination on the values of said second pixel-by-pixel differences, is higher than a contribution of a corresponding first group of second quantized values to said third cumulated value, wherein said second pixel-by-pixel differences of the first group have an absolute value lower than a third threshold, wherein said associating a respective second quantized value may include associating to at least said first group of second pixel-by-pixel differences respective second quantized values being lower, in absolute value, than said second pixel-by-pixel differences of the first group, wherein said associating to at least said first group of second pixel-by-pixel differences respective second quantized values being lower in absolute value may include associating to each second pixel-by-pixel difference of said first group a respective second quantized value equal to zero, wherein said associating to each second pixel-by-pixel difference of said first group a respective second quantized value equal to zero may include truncating to a prescribed number of digits a numeric code representing the respective second pixel-by-pixel difference absolute value, and wherein said associating to each second pixel-by-pixel difference of said first group a respective second quantized value equal to zero further comprises, before truncating, multiplying the respective second pixel-by-pixel difference absolute value by a predetermined constant value.

In still other embodiments of the invention, said associating a respective second quantized value may include associating to a second group of second pixel-by-pixel differences, having an absolute value higher than or equal to the third threshold, respective second quantized values being higher, in absolute value, than said second pixel-by-pixel differences of the second group;

said associating a respective second quantized value may include raising each of the second pixel-by-pixel differences to an even exponent, particularly squaring them;

said electing one among the determined prediction image blocks may include choosing the prediction image block having the lowest third cumulated absolute value;

said skip-mode prediction block may comprise a portion of an already processed image; and said performing a combination of the quantized values so as to obtain a cumulated value may comprise summing absolute values of said quantized values.

According to a second aspect of the present invention, a digital image encoder is provided, comprising:

an image block extractor adapted to extract, from at least a portion of an image to be encoded, image blocks formed by a plurality of pixels, and an image block processor adapted to processing each image block of the image. The image block processor includes:

a skip-mode predictor calculator adapted to determine a skip-mode prediction block in respect of the image block being processed;

a first block-difference calculator adapted to calculate a difference between the image block being processed and the skip-mode prediction block;

a comparator adapted to compare the calculated difference between the image block being processed and the skip-mode prediction block to a predetermined first threshold;

an image-block predictor calculator adapted to calculate prediction image blocks in respect of the image block being processed;

a predictor selector adapted to elect one among the prediction image blocks; and an image block encoder adapted to coding a difference between the image block being processed and the elected prediction image block.

At least one among said image-block predictor calculator, predictor selector, and image block encoder are adapted to be activated conditioned to a first output of said comparator.

The first block-difference calculator includes:

a first pixel-by-pixel difference calculator adapted to calculate a plurality of pixel-by-pixel differences between pixels of the current image block and corresponding pixels of the skip-mode prediction image block;

a first pixel-by-pixel difference processor adapted to associate a respective quantized value to each of said pixel-by-pixel differences; and a first cumulating processor adapted to performing a combination of the quantized values so as to obtain a cumulated value representing said difference between the current image block being processed and the skip-mode prediction block.

The association of the quantized values is performed by said first pixel-by-pixel difference processor such that a contribution of a first group of pixel-by-pixel differences to a second cumulated value, obtainable by performing said combination on the values of said pixel-by-pixel differences, is higher than a contribution of a corresponding first group of quantized values to said cumulated value, wherein said pixel-by-pixel differences of the first group have an absolute value lower than a second threshold.

In preferred embodiments of the digital image encoder, said image block encoder may also be adapted to skip said coding, conditioned to a second output of said comparator, wherein said first pixel-by-pixel difference processor may be adapted to associate to at least said first group of pixel-by-pixel differences respective quantized values being lower, in absolute value, than said pixel-by-pixel differences of the first group, wherein said first pixel-by-pixel difference processor may be adapted to associate to each of said at least said first group of pixel-by-pixel differences a respective quantized value equal to zero, wherein said first pixel-by-pixel difference processor is adapted to truncate to a prescribed number of digits a second numeric code representing the respective pixel-by-pixel difference absolute value, and wherein said first pixel-by-pixel difference processor may also be adapted to multiply, before truncating, the respective pixel-by-pixel difference absolute value by a predetermined second constant value.

In other embodiments of the digital image encoder, said first pixel-by-pixel difference processor may be adapted to associate to a second group of pixel-by-pixel differences, having an absolute value higher than or equal to the second threshold, respective quantized values being higher, in absolute value, than said pixel-by-pixel differences of the second group, or said first pixel-by-pixel difference processor is adapted to raise each of the pixel-by-pixel differences to an even exponent, particularly the square.

The digital image encoder may further comprise a second block-difference calculator (225) adapted to calculate a difference between the image block being processed and each of the prediction image blocks, wherein said second block-difference calculator may comprise:
- a second pixel-by-pixel difference calculator (305) adapted to calculate a plurality of second pixel-by-pixel differences, wherein each of said second pixel-by-pixel differences is calculated between a pixel of the image block being processed and a corresponding pixel of a generic prediction image block;
- a second pixel-by-pixel difference processor (310, 315) adapted to process said second pixel-by-pixel differences so as to obtain a respective plurality of processed second pixel-by-pixel difference values; and
- a second cumulating processor (320) adapted to combine said processed second pixel-by-pixel difference values so as to obtain a third cumulated value, representing the difference between the image block being processed and the generic prediction image block; or wherein said second block-difference calculator may comprise:
- a second pixel-by-pixel difference calculator (305) adapted to calculate a plurality of second pixel-by-pixel differences, wherein each of said second pixel-by-pixel differences is calculated between a pixel of the image block being processed and a corresponding pixel of a generic prediction image block;
- a second pixel-by-pixel difference processor (310, 315) adapted to associate a respective second quantized value to each of said second pixel-by-pixel differences; and
- a second cumulating processor (320) adapted to perform a combination (320) of the second quantized values so as to obtain a third cumulated value (SQUAD) representing said difference between the image block being processed and the generic prediction image block, wherein the association of a respective quantized value may be performed by said second pixel-by-pixel difference processor such that a contribution of a first group of the second pixel-by-pixel differences to a fourth cumulated value, obtainable by performing said combination on the values of said second pixel-by-pixel differences, is higher than a contribution of a corresponding first group of second quantized values to said third cumulated value, wherein said second pixel-by-pixel differences of the first group have an absolute value lower than a third threshold, wherein said second pixel-by-pixel difference processor may be adapted to associate to at least said first group of second pixel-by-pixel differences respective second quantized values being lower, in absolute value, than said second pixel-by-pixel differences of the first group, wherein said second pixel-by-pixel difference processor is adapted to associate to each second pixel-by-pixel difference of said first group a respective second quantized value equal to zero, wherein said second pixel-by-pixel difference processor is adapted to truncate to a prescribed number of digits a second numeric code representing the respective second pixel-by-pixel difference absolute value, and wherein said second pixel-by-pixel difference processor is also adapted to multiply, before truncating, the respective second pixel-by-pixel difference absolute value by a predetermined second constant value.

In still other embodiments of the digital image encoder of the present invention, said second pixel-by-pixel difference processor may be adapted to associate to a second group of second pixel-by-pixel differences, having an absolute value higher than or equal to the second threshold, respective quantized values being higher, in absolute value, than said second pixel-by-pixel differences of the second group;

wherein said second pixel-by-pixel difference processor may be adapted to associate a respective second quantized value includes raising each of the second pixel-by-pixel differences to an even exponent, particularly squaring them;

wherein said predictor selector may be adapted to choose the prediction image block having the lowest third cumulated absolute value;

wherein said skip-mode prediction block may comprise a portion of an already processed image; and wherein said first cumulating processor comprises an adder adapted to sum absolute values of said quantized values.

According to a third aspect of the present invention, a communication terminal, particularly a videotelephone, including the above digital image encoder is provided.

BRIEF DESCRIPTION OF THE DRAWINGS

The features and advantages of the present invention will be made apparent by the following detailed description of some embodiments thereof, provided merely by way of non-limitative example, description that will be conducted by making reference to the annexed drawings, wherein:

FIG. 5 shows by way of comparison few frames of a video sequence encoded by the conventional method and by a method according to an embodiment of the present invention, resulting from simulations conducted by the Applicant.

DETAILED DESCRIPTION OF THE PREFERRED EMBODIMENT(S) OF THE INVENTION

Figure 1:
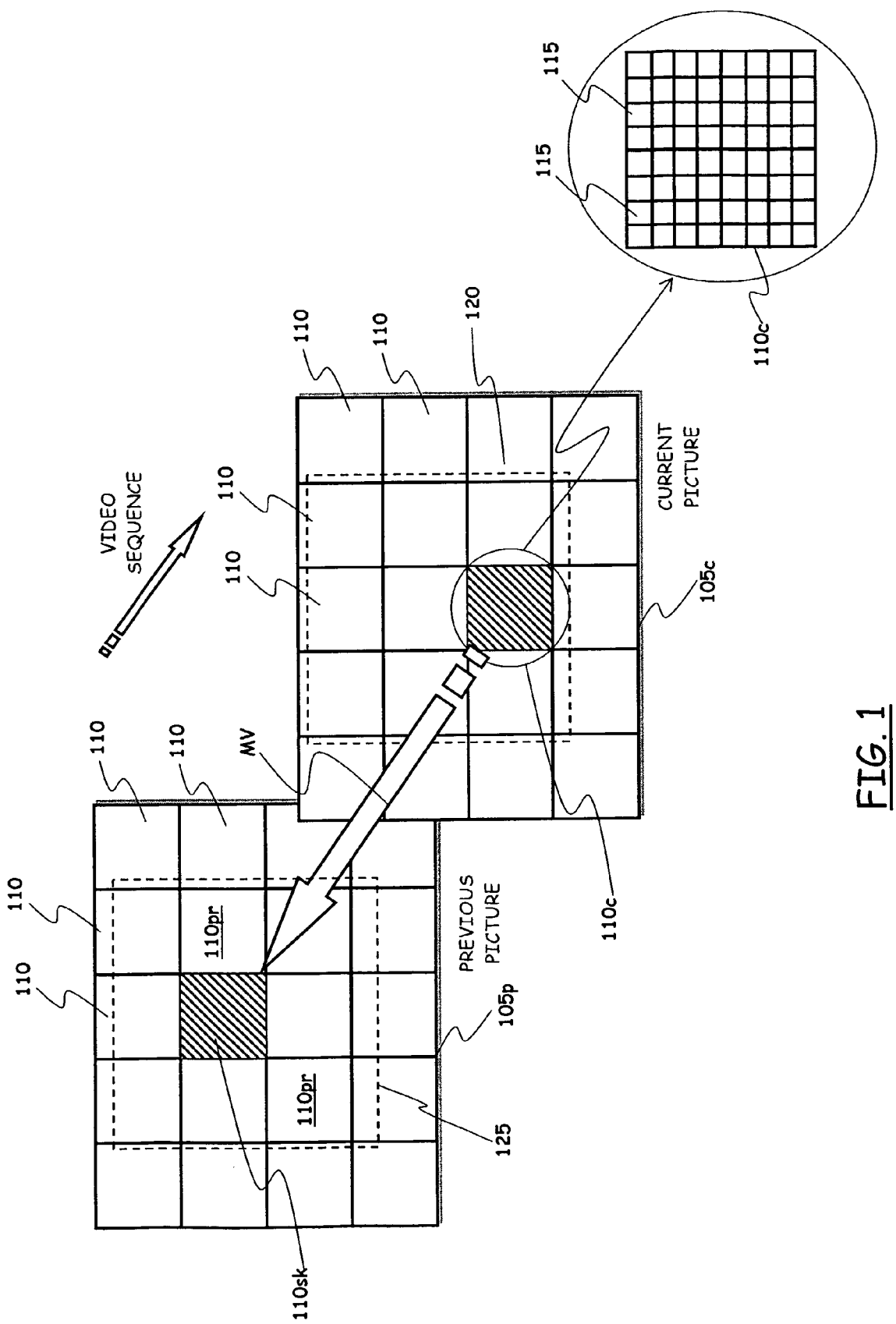
FIG. 1 pictorially shows two images (e.g., a previous and a current image frame) of a video sequence, divided into image blocks.

Referring to the drawings, in FIG. 1 an image or picture $105c$ is schematically depicted; the image $105c$ is for example a frame in a video sequence to be encoded for transmitting or storing it. The image $105c$ is assumed to be the picture of the video sequence currently being processed, or current picture. The current picture $105c$ is subdivided into a plurality of image blocks 110, each one comprising a prescribed number of pixels, arranged to form a matrix of, e.g., 8 by 8 pixels 115, as depicted in enlarged detail for the image block $110c$ (which in the following will be assumed to be the image block currently being processed, or current image block).

Also depicted in FIG. 1 is another picture $105p$, which is assumed to be a previous picture in the video sequence, i.e. an image that, in the coding order, precedes the current picture $105c$ (e.g., the previous picture $105p$ may be the image that, in the video sequence, immediately precedes the current picture $105c$). Similarly to the current picture $105c$, the previous picture $105p$ is subdivided into a plurality of image blocks 110, each one comprising the predefined number (e.g., 8 by 8) of pixels 115.

As mentioned in the introductory part of the present specification, the modern and most widely adopted video coding algorithms implement the so-called differential coding: the generic image block under consideration, e.g. the current image block 110c, is compared with other image blocks, i.e. the so-called prediction image blocks, which, using conventional prediction techniques, may be derived from the same current picture 105c as the current image block under processing (so-called "intra prediction" mode) or from previously-transmitted images, like the picture 105p (so-called "inter prediction" mode).

In particular, in the current picture 105c, an area depicted as delimited by a dashed-line rectangle 120 is meant to schematize a current picture (search) area around the current image block 110c in which prediction image blocks to be compared to the current image block 110c are calculated in the processing of the current image block 110c, according to the intra prediction mode; similarly, in the previous picture 105p, an area depicted as delimited by a dashed-line rectangle 125 is meant to schematize a previous picture (search) area in which prediction image blocks to be compared to the current image block 110c are calculated in the processing of the current image block 110c, according to the inter prediction mode; conventional motion estimation and compensation techniques may be applied to determine the area 125 in the previous image block in respect to the current image block 110c. In particular, without entering into details well known to those skilled in the art, based on the result of the encoding of previous image blocks, motion vectors are calculated, which provides an estimation of the possible displacement of, e.g., image portions contained in the current image block 110c from the previous picture to the current picture; given the current image block 110c, the motion vectors are applied thereto to determine prediction image blocks 110pr for the current image block 110c, which prediction image blocks 110pr are located in the search area 125 in the previous picture 105p.

Figure 2:
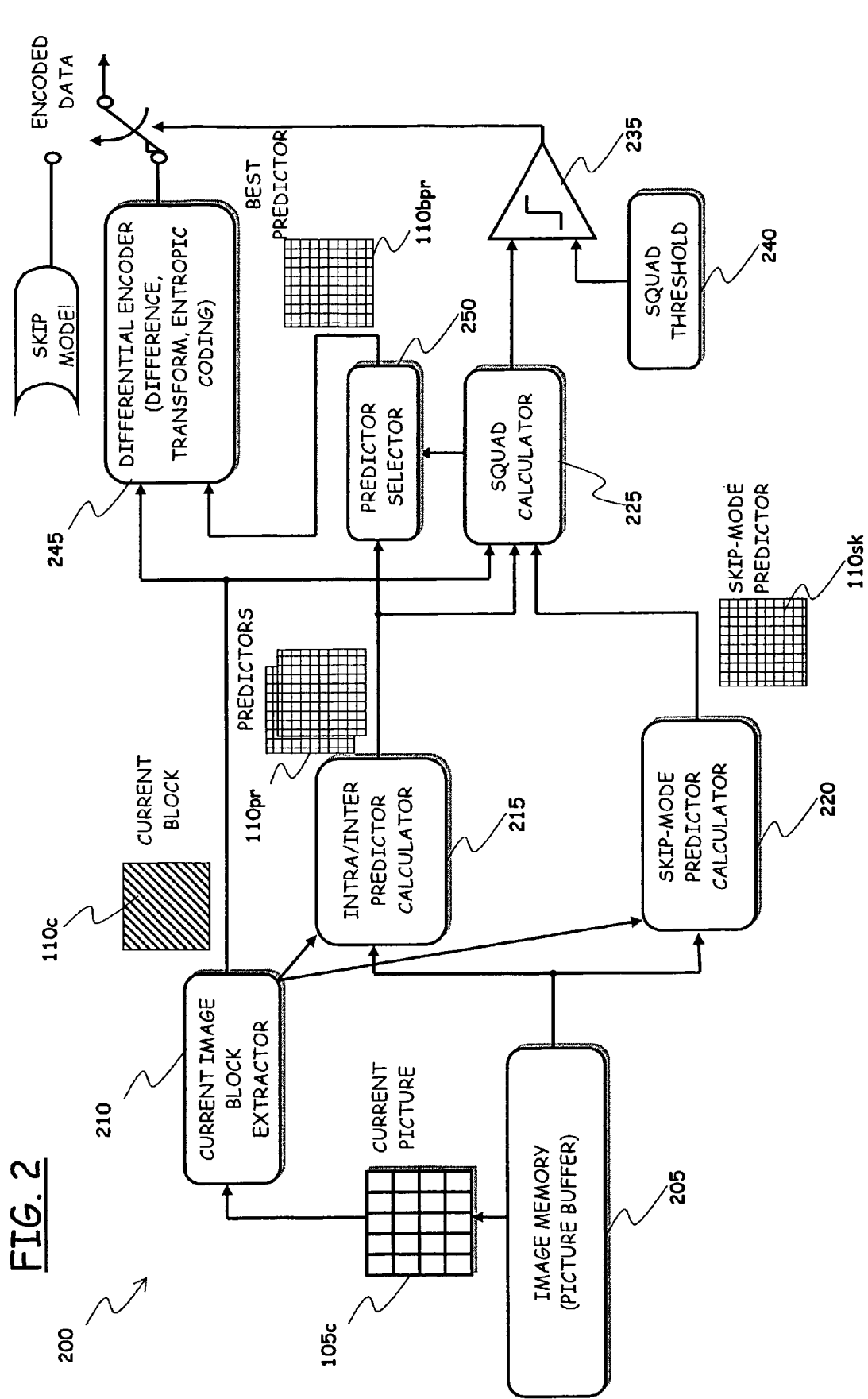
FIG. 2 is a schematic, very simplified block diagram of a digital video encoder according to an embodiment of the present invention.

Reference is now made to FIG. 2, which provides a schematic, very simplified diagram, in terms of functional blocks, of a digital video encoder 200 according to an embodiment of the present invention.

An image memory 205 is provided, acting as a picture buffer for the current picture 105c and adapted to store (a certain number of) previously coded pictures in the video sequence, like the previous picture 105p. The image memory 205 may for example receive image data from a videocamera, for example the videocamera embedded in a mobile phone, a smartphone, a PDA (Personal Digital Assistant), or a videotelephone.

From the image memory 205, a current image block extractor 210 extracts the current image block 110c to be processed.

Based on the current picture 105c and on the previous pictures, like the picture 105p, an intra/inter predictor calculator 215 determines, for the current image block 110c, prediction image blocks 110pr (a plurality of prediction image blocks are typically calculated), based on an intra and/or an inter prediction calculation technique. In particular, the intra predictor image blocks belongs to (the search area 120 of) the current picture 105c, whereas the inter predictor image blocks are image blocks (in the search area 125) of the previous picture 105p.

A skip mode predictor calculator 220 calculates the prediction image block 110sk associated with the skip-mode coding of the current image block 110c, that is, the prediction image block which, if selected as a representation of the current image block, needs no information to be transmitted/stored. In particular, the skip coding mode is a special case of inter coding mode where no information is transmitted, and in the decoding phase the image block currently under processing is simply reconstructed starting from the previous image data, based on a predefined set of rules. In other words, the coding of the image block is skipped. For example, in the AVC standard the skip-mode coding exploits motion vectors that allow to derive prediction data from different points of an image. As schematized in FIG. 1, the skip-mode prediction image block 110sk is determined (as a part of the inter prediction) exploiting a skip-mode prediction motion vector MV, calculated as a result of the previous coding of other image blocks of the current picture, to establish the position, in the previous picture 105p, where the image portion contained in the current image block 110c allegedly was (under the assumption that the current motion vector MV properly describes the displacement of that image portion). In case, for a generic image block under processing, the skip-mode coding applies, that image block is reconstructed, in the decoding phase, by calculating the motion vectors, and applying the calculated motion vector to determine which image block, in the previous picture, contains the image data to be used for reconstructing the current image block.

The current image block 110c, and the calculated prediction image blocks 110pr and skip-mode prediction image block 110sk are fed to a pixel-by-pixel differences cumulating processor, particularly a sum-of-differences calculator 225, adapted to cumulate, particularly by calculating the sum of pixel-by-pixel differences between the current image block 110c and the generic prediction image block 110pr or the skip-mode prediction image block 110sk; in particular, the calculator 225 is adapted to calculate a Sum-of-Quantized-Absolute-Differences (SQUAD) on a pixel-by-pixel basis. In the SQUAD calculation a quantized value is associated to each difference between the current image block 110c and the generic prediction image block 110pr or the skip-mode prediction image block 110sk; the quantized values are then combined so as to obtain a cumulated value (SQUAD value), e.g. summed together. A general rule for the quantization of the differences between current image block 110c and the generic prediction image block 110pr or the skip-mode prediction image block 110sk is that an overall contribution of quantized values corresponding to "small" difference values (due, e.g., to noise) to the cumulated SQUAD value should be reduced (with respect to the contribution of the corresponding small difference values in the SAD value), or possibly neglected, so as to obtain a high SQUAD value only in cases in which the two image blocks being compared with each other differ significantly. Equivalently, the quantization of the differences between the two image blocks is performed so as to increase the overall contribution of the quantized values corresponding to "high" differences in the cumulated SQUAD value (with respect to the contribution of the high difference values in the SAD value). The overall contribution of a group of values with respect to a total cumulated value can be evaluated, for example, by performing a ratio of the partial cumulated value formed by the group of values under consideration with respect to the total cumulated value. Possible examples of applicable difference quantizations may comprise associating respective lower (or zero) quantized values to pixel-by-pixel differences lower (in absolute value) than a given threshold, and/or by associating respective higher quantized values to pixel-by-pixel differences higher than (or equal to) the given threshold. Another possible implementation of a "quantization" according to the general rule disclosed above could be squaring the difference values (or, more generally, raising an absolute value of the differences to a power higher than one), so that the contribution of the higher difference values is enhanced with respect to the contribution of the smaller difference values. The Applicant has found that the SQUAD calculation provides a good parameter for determining if the encoding of current image block could be skipped (i.e. for evaluating the difference between the skip-mode prediction image block with respect to the current image block), in contrast with the SAD calculation. However, it may be provided that the SQUAD parameter could be used also for evaluating the differences between the current image block and the prediction image blocks.

Coming back to FIG. 2, the output of the calculator 225, providing the calculated SQUAD in respect of the skip-mode prediction image block 110*sk* is fed to a comparator 235, adapted to compare the calculated, skip-mode prediction image block SQUAD with a predetermined SQUAD threshold 240, in order to make the decision of whether or not to adopt the skip mode for the current image block 110*c*.

The output of the calculator 225 is fed to a predictor selector 250 that is adapted to select, among the different prediction image blocks 110*pr*, a best prediction image block 110*bpr*, based on the cumulated pixel-by-pixel differences, particularly the sum-of-difference values calculated by the calculator 225. The best predictor image block 110*bpr* and the current image block 110*c* are fed to a differential encoder 230, adapted to calculate the difference between the current image block and the selected prediction image block, and to apply to the calculated difference the spatial transform and the entropic coding, so as to obtain encoded data to be transmitted/stored.

The SQUAD threshold 240 can be fixed or it can change so as to be adaptive; for example, the threshold can be made to depend on the past history of the encoder, for example choices made by the encoder in the past, and/or on the importance of the current image block in the context of the image. For example, in the context of a videoconference, a "segmentation algorithm" might provide a possibly rough indication that the image block under processing belongs to the person in the foreground or rather to the background; the threshold value might be raised in respect of the (more significant, and for which the skip mode coding needs to be applied with care) image blocks belonging to the image in foreground, and reduced for the background image blocks. The SQUAD threshold 240 may be dynamically established, based for example on look-up tables, depending on the current Quantization Parameter (QP), i.e. on the desired quality of the reconstructed image. Past choices made by the encoder may for example condition the value of the SQUAD threshold 240 in that if, for the image blocks that, in the previous images, were spatially co-located to the current image block, the skip mode coding has been applied more than a prescribed number of times, the threshold value is reduced, so as to favor the refresh of the image block data in the intra mode and avoid possible persistent artifacts in the reconstructed image.

Figure 3:
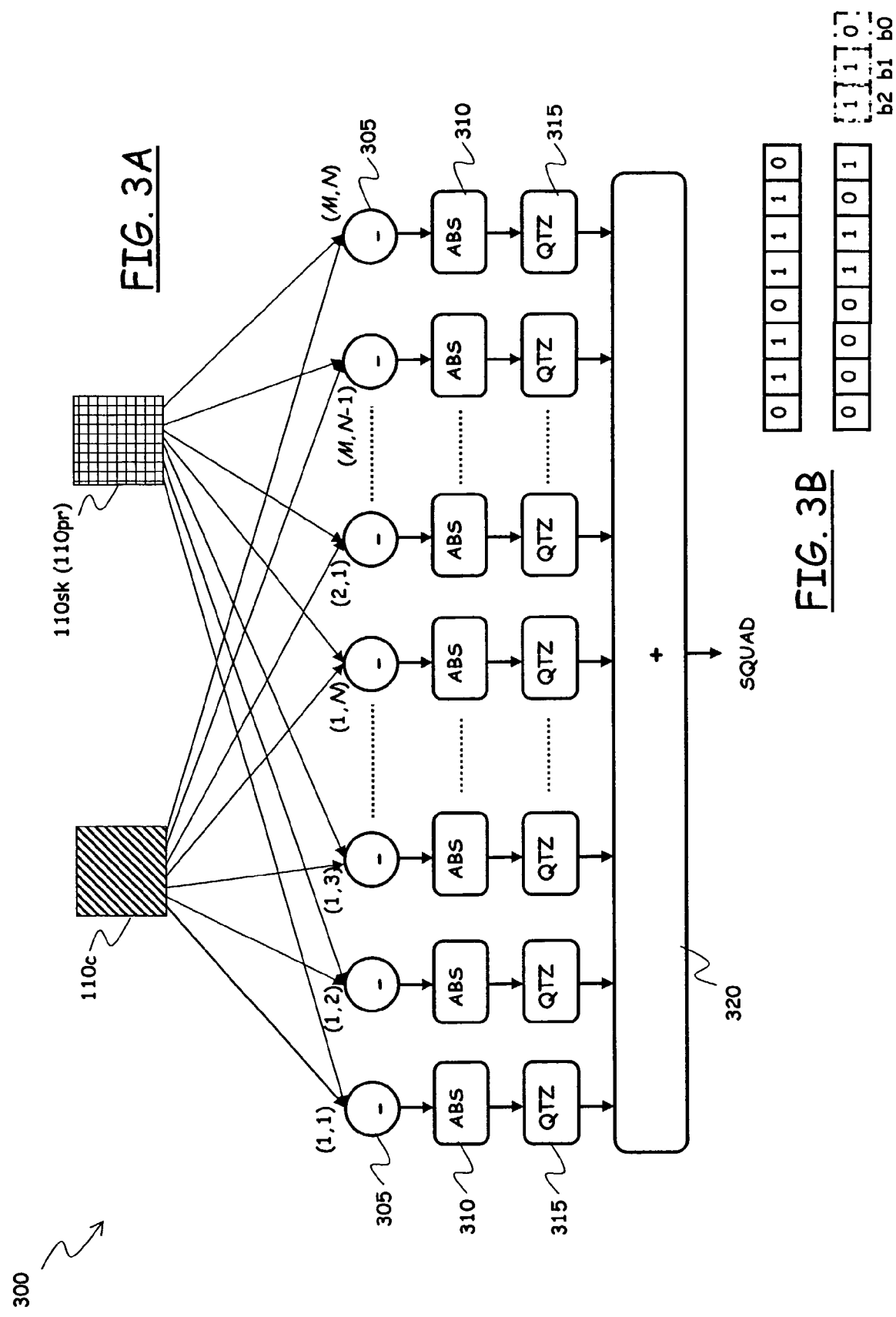
FIG. 3 is a schematic diagram of a Sum-of-Quantized-Differences (SQUAD) calculator used in the digital video encoder of FIG. 2, according to an embodiment of the present invention.

FIG. 3A depicts, still schematically but in greater detail, a possible implementation of the pixel-by-pixel differences cumulator 225, particularly a SQUAD calculator used in the digital video encoder of FIG. 2, according to an exemplary embodiment of the present invention. However, the sum-of-differences calculator 225 of FIG. 2 may include, in addition to a SQUAD calculator, a SAD calculator and/or an SSD calculator.

The SQUAD calculator, globally identified by 300, comprises a plurality of subtractors 305, adapted to calculate the difference (in luminance, or chrominance, as will be discussed later) between the values of two pixels. The generic subtractor 305 of the plurality operates the difference between the $(i^{th} j^{th})$ (where i=1, 2, ..., M, and j=1, 2, ..., N) pixel of the current image block 110*c* and the corresponding $(i^{th} j^{th})$ pixel of the skip-mode prediction image block 100*sk* (or of the generic one of the prediction image blocks 110*pr*); thus, in this embodiment of the invention, a number of subtractors 305 equal to the number of pixels of the generic image block is provided for (M by N, where for example M=N=8 or 16). The generic subtractor 305 may be implemented by means of a full adder with a 2's complementor, which performs the 2's complement of one of the inputs before calculating the addition.

The output of the generic subtractor 305, representing the difference (with algebraic sign) between the $(i^{th},j^{th})$ pixels of the current image block 110*c* and the skip-mode prediction image block 100*sk* (or the prediction image block 110*pr* under consideration), is processed to derive a corresponding difference value, such that all the difference values have a same algebraic sign. In particular, the output of the generic subtractor 305 can be fed to a respective absolute value extractor 310, adapted to extract the absolute value of the calculated difference. The generic absolute value extractor 310 may for example be implemented by means of a multiplexer fed with the calculated difference and the 2's complement thereof (calculated by a negator), and controlled by the Most Significant Bit (MSB) of the calculated difference (the MSB represents the sign of the difference).

The extraction of the absolute value of each of the calculated differences allows having difference values all of a same algebraic sign, particularly positive difference values. In this way, it is prevented that, in the overall calculation, negative pixel difference values get subtracted from positive pixel difference values. As an alternative to extracting the absolute value, the output of the generic subtractor 305 may for example be squared (or, more generally, raised to an even exponent).

The pixel-by-pixel differences cumulator 225 is adapted to cumulate the difference values derived from the pixel-by-pixel difference calculation process.

The output of the generic absolute value extractor 310, representing the above-mentioned pixel difference deprived of sign, is fed to a respective quantizer 315, adapted to scaling down the absolute value of the calculated difference, i.e. reducing the number of bits in the binary code representing the absolute value of the calculated difference.

In particular, the generic quantizer 315 may include a shift register, and the operation performed thereby may be a bit shift on the binary code provided in input thereto, i.e. on the binary representation of the (absolute value) difference between the corresponding pixels $(i^{th},j^{th})$ in the current image block and the prediction image block 110*pr* under consideration or the skip-mode prediction image block 100*sk*; particularly, as schematically depicted in FIG. 3B, a right-shift operation may be performed, shifting to the right the input binary code of a prescribed number of bits (e.g. three bits; in this case the operation corresponds to dropping the least significant three bits b0, b1, b2). For example, assuming that the (luminance of the generic pixel) is represented as an eight-bit binary code, corresponding to an integer value in the range from 0 to 255, also the absolute-value difference between (the luminance of) two generic pixels is in the range from 0 to 255, i.e. it is represented by an eight-bit code. The precision of the generic pixel-by-pixel (luminance, or chrominance) difference can be reduced (scaled down) to a five-bit number simply by right-shifting the eight-bit code of three bits; in this case, an eight-bit arithmetic is sufficient. As an alternative, if it is desired that the number of bits dropped is not an integer, the input binary code may be preliminary multiplied by a constant, before performing the bit shift. For example, the precision of the generic pixel-by-pixel (luminance) difference can be reduced to approximately 6.5 bits by preliminary multiplying the eight-bit input code by 181, and then performing a right shift of 9 bits (a 16-bit arithmetic needs in this case to be used). As a further alternative, a non-linear quantizer may be used, as well as an arithmetic different from the binary one. More generally, the quantizer 315 can be adapted to reduce the precision of the calculated pixel-by-pixel difference, so that small difference values, that may for example be induced by noise, are treated as if the difference between the pixels were zero, and do not contribute to the final sum of differences.

As for the threshold 240 discussed above, the quantization curve (e.g. the extent of the right-shift, in terms of number of bits) can be fixed or it can change, being in particular adaptive, e.g. based on the desired quality of the reconstructed image. It can be appreciated that the operation of right-shifting corresponds to establishing a threshold below which the (absolute value of the) pixel-by-pixel difference is neglected and does not contribute to increase the cumulated value.

The outputs of the quantizers 315 are added up by an adder 320, whose output provides the SQUAD in respect of the two image blocks 110c and 110sk or 110pr.

It is observed that, in an embodiment of the invention, the SQUAD calculator may calculate the pixels' luminance difference (in this case, for each generic pixel pair, one SQUAD value is obtained). However, in a preferred embodiment of the invention, the SQUAD calculator is adapted to calculate the pixels' luminance and chrominance difference; in this case, the SQUAD calculator may include three calculators of the type just described; for each generic pixel pair, three SQUAD values are obtained, one representing the luminance difference, and the other two being the differences in the two chrominance channels.

Figure 4:
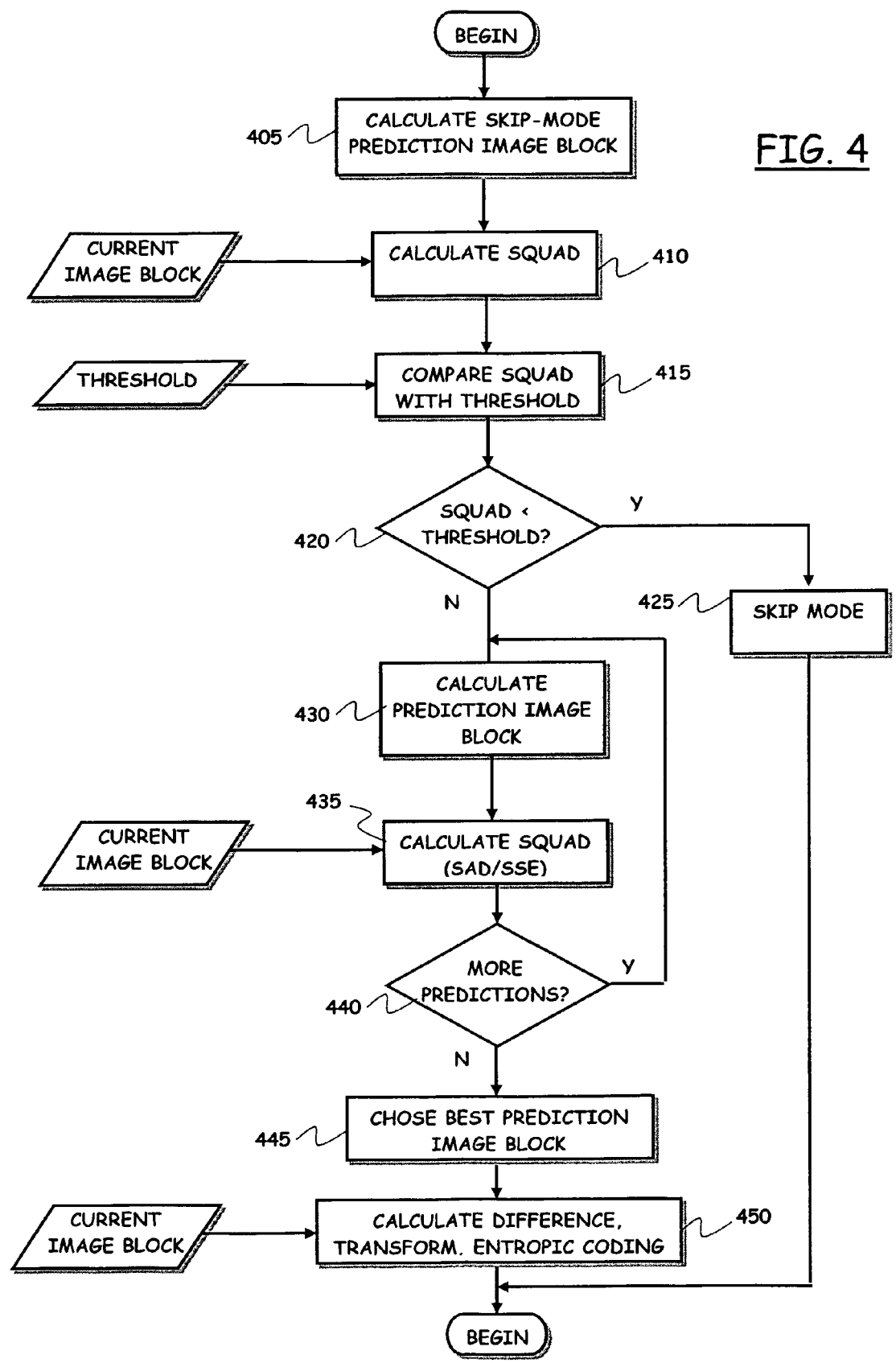
FIG. 4 is a schematic, simplified flowchart illustrating the operation of the digital video encoder of FIG. 2, in an embodiment of the present invention.

A coding method according to an embodiment of the present invention will be now described, making reference to the simplified flowchart of FIG. 4.

For the generic current image block 110c, the skip-mode prediction image block 110sk is calculated (block 405).

The SQUAD in respect of the current image block 110c and the skip-mode prediction image block 110sk is then calculated (block 410).

The calculated SQUAD is then compared to the SQUAD threshold 240 (block 415). If the calculated SQUAD results to be lower than the threshold 240 (exit branch Y of decision block 420), the encoder decides for the skip mode (block 425); the encoding of the current image block 110c is in this case achieved substantially free of cost (no information need to be transmitted). The encoding process of the image block terminates: the encoder needs not calculating the prediction image blocks, nor does it have to calculate any further SAD or SSD: all these actions are just skipped. The comparison of the SQUAD value with the threshold may be preferably performed on SQUAD values based on both the luminance and the chrominance values: in such case, if all the SQUAD values pass the test, the block is skipped.

If on the contrary the calculated SQUAD is too high (it is not lower than the SQUAD threshold 240) (exit branch N of decision block 420), the encoder passes to calculating the predictor image blocks 110pr. In particular, the generic prediction image block 110pr is calculated (block 430); then, the SQUAD in respect of that prediction image block is calculated (block 435); as an alternative to the SQUAD, the SAD or the SSD may be calculated. These operations (calculation of the prediction image block and calculation of the corresponding SQUAD) are performed on every possible prediction image block (as represented by the loop in the flowchart controlled by the decision block 440).

After having calculated the SQUAD (or SAD/SSD) for every possible prediction image block in respect of the current image block, the best prediction image block 110bpr is selected (block 445); in particular, the selected prediction image block is the one for which the calculated SQUAD (or SAD/SSD) is the lowest.

A differential coding of the current image block 110c is then performed using the selected prediction image block 110bpr; the differential coding includes calculating the difference between the current image block and the selected prediction image block, applying the transform function to the calculated difference, scaling/quantizing the transformed difference, and applying the entropic coding.

As a result of the differential encoding, data are obtained that can be transmitted/stored. The encoding process of the current image block ends.

The above operations are iterated on all the image blocks of the current picture, as well as on successive pictures.

The performance of the described method and system have been evaluated by the Applicant by comparing the results of simulations. A video sequence (of a speaker) has been encoded exploiting one of the conventional differential block coding techniques discussed in the background part of the present specification, wherein the decision on whether to adopt the skip mode is performed after the calculation of all the prediction image blocks; the same video sequence has then been encoded exploiting the described method, wherein the decision on whether to adopt the skip mode is performed before calculating the prediction image blocks, exploiting the SQUAD technique. FIG. 5 schematically shows four image frames (frame 0 to frame 3) of the resulting encoded video sequences: in the left column, the frames encoded with the conventional technique are shown, whereas the frames on the right column have been encoded with the method according to the present invention. In the encoded image frames, the image blocks are represented as either an "X" or a dot: the image blocks represented as an "X" are blocks encoded adopting the skip mode, whereas the image blocks represented as a dot are not encoded using the skip mode.

By comparing the corresponding frames in the video sequence, it can be appreciated that the image blocks that have been encoded using the skip mode are essentially the same in the two cases; in particular, in both cases the rate of "skipped" image blocks is approximately equal to 55% of the overall number of image blocks. However, the simulations evidenced that by exploiting the method according to the present invention, approximately 51% of the processing time required by the conventional method is saved; this means that the method according to the present invention reduces substantially to zero the time spent for processing the image blocks that are "skipped".

The described coding method according to the present invention allows a substantial reduction in processing power and time.

By anticipating the decision on whether to adopt the skip mode for the generic image block, the time required for processing an image block may be reduced to the time necessary for calculating one SQUAD; in those cases in which the number of image blocks for which the skip mode can be adopted are a significant part of the overall number of image blocks, the processing power and time of an image frame may drastically drop to a fraction of the time that would be needed adopting a conventional encoding method. As a matter of fact, in common applications it frequently happens that a substantial part of a generic video sequence has more or less uniform and/or static (i.e., not varying or slowly varying in time) image areas; this is for example the case of image backgrounds; in these cases, the encoder may decide to use the skip-mode coding for most of the image blocks. This is in particular the case of low bit rate applications (for example, some hundreds of Kbits/s or less), wherein the bits available for transmitting the image/video sequence are very limited in number; example of low bit rate applications which greatly benefit of the skip-mode coding are videoconferences, videosurveillance, and in general all those applications wherein, for most of the pictures in a video sequence, there are substantially no changes in time, at least for a significant picture portion.

This allows for example exploiting relatively low-performance (and thus, low cost) data processors for performing a function which, according to the prior art, would need a higher-performance CPU or DSP, and/or to save processing time which can be dedicated to different applications, for example for implementing more sophisticated algorithms that improves the quality of the encoded pictures.

The use of the SQUAD, which involves a quantization performed directly in the image domain, tends to produce similar effects of the conventional quantization on the transformed function, but without the same burden in terms of processing power: in particular, it allows neglecting (masking) the effects of small differences spread over several pixels (a similar effect would be achieved by the quantization on the transformed function, but at the cost of a much heavier processing), and, on the other hand, it allows to detect large differences concentrated on few pixels. Basing the decision on whether to adopt the skip mode on a sum-of-differences value that is quantized in the image domain allows to avoid producing errors due for example to image noise (which would cause not to adopt the skip mode even in cases in which it would be perfectly suitable), or to skip an image block which, on the contrary, has significant differences with the skip-mode prediction block, but concentrated on few pixels.

The coding method according to the present invention may be implemented fully in software, fully in hardware, or partly in hardware and partly in software. A full-hardware implementation may be preferable to speed-up the processing. In particular, and just by way of example, the operation of the absolute value extractors (or their equivalent implementations) and of the quantizers in the pixel-by-pixel differences cumulator may be implemented by means of look-up tables with establishing association of ranges of pixel-by-pixel difference values.

The coding method according to the present invention can be applied in general whenever image data, e.g. a video sequence has to be compressed. In particular, they are expediently usable in videocommunications terminals, such as videotelephones (fixed or mobile), smartphones, PDAs, personal computers and the like.

Finally, the present invention has been disclosed and described by way of some embodiments, however several modifications to the described embodiments may result apparent to those skilled in the art, as well as other embodiments of the present invention are possible, without departing from the scope thereof as defined in the appended claims.

For example, it may be provided that a certain number of image blocks are selected so as to provide a statistically-reliable sample; on these blocks, a conventional coding is applied (for example, applying the SAD/SSD technique); the larger part of the image blocks are processed exploiting the method according to the described embodiment of the invention, involving for example the SQUAD technique. Then, based on a comparison of the number of times the skip mode coding is adopted, the skip-mode coding threshold may be varied, e.g. increased/decreased if it is ascertained that the application of the SQUAD technique excessively favors/disfavors the skip-mode coding.

The invention claimed is:

1. A method of coding a digital image, comprising:
   subdividing at least a portion of the image into image blocks formed by a plurality of pixels; and
   processing each image block, wherein said processing comprises, for a generic current image block being processed:
   determining a skip-mode prediction block with respect to the current image block being processed, calculating a difference between the image block being processed and the skip-mode prediction block, comparing the calculated difference to a predetermined threshold; and
   determining, for the current image block being processed, prediction image blocks, electing one among the determined prediction image blocks and coding a difference between the elected prediction image block and the current image block,
   wherein at least one among said determining, electing, and coding is performed conditioned to a first result of said comparing the calculated difference to the first threshold,
   wherein said calculating a difference between the current image block being processed and the skip-mode prediction block comprises:
   calculating a plurality of pixel-by-pixel differences, wherein each of said pixel-by-pixel differences is calculated between a pixel of the current image block and a corresponding pixel of the skip-mode prediction image block;
   associating a respective quantized value with each of said pixel-by-pixel differences; and
   performing a combination of the quantized values so as to obtain a cumulated value representing said difference between the current image block being processed and the skip-mode prediction block,
   wherein said associating a respective quantized value is performed such that a contribution of a first group of pixel-by-pixel differences to a second cumulated value, obtainable by performing said combination on the values of said pixel-by-pixel differences, is higher than a contribution of a corresponding first group of quantized values to said cumulated value, wherein said pixel-by-pixel differences of the first group have an absolute value lower than a second threshold.

2. The method according to claim 1, further comprising, conditioned on a second result of said comparing, skipping said coding of the current image block.

3. The method according to claim 1, wherein said associating a respective quantized value comprises associating with at least said first group of pixel-by-pixel differences, respective quantized values lower, in absolute value, than said pixel-by-pixel differences of the first group.

4. The method according to claim 3, wherein said associating with at least said first group of pixel-by-pixel differences respective quantized values lower in absolute value comprises associating with each pixel-by-pixel difference of said first group a respective quantized value equal to zero.

5. The method according to claim 4, wherein said associating with each pixel-by-pixel difference of said first group a respective quantized value equal to zero comprises truncating to a prescribed number of digits a numeric code representing the respective pixel-by-pixel difference absolute value.

6. The method according to claim 5, wherein said associating with each pixel-by-pixel difference of said first group a respective quantized value equal to zero further comprises, before truncating, multiplying the respective pixel-by-pixel difference absolute value by a predetermined constant value.

7. The method according to claim 1, wherein said associating a respective quantized value comprises associating with a second group of pixel-by-pixel differences, having an absolute value higher than or equal to the second threshold, respective quantized values higher, in absolute value, than said pixel-by-pixel differences of the second group.

8. The method according to claim 1, wherein said associating a respective quantized value comprises raising each of the pixel-by-pixel differences to an even exponent, or to the square.

9. The method according to claim 1, wherein said electing one among the determined prediction image blocks comprises calculating differences between the current image block being processed and the prediction image blocks.

10. The method according to claim 9, wherein said calculating differences between the current image block being processed and the prediction image blocks comprises, for each generic prediction image block:
    calculating a plurality of second pixel-by-pixel differences, wherein each of said second pixel-by-pixel differences is calculated between a pixel of the current image block and a corresponding pixel of the generic prediction image block;
    processing said second pixel-by-pixel differences so as to obtain a respective plurality of processed second pixel-by-pixel difference values; and
    combining said processed second pixel-by-pixel difference values so as to obtain a third cumulated value, representing the difference between the current image block being processed and the generic prediction image block.

11. The method according to claim 9, wherein said calculating differences between the current image block being processed and the prediction image blocks comprises, for each generic prediction image block:
    calculating a plurality of second pixel-by-pixel differences, wherein each of said second pixel-by-pixel differences is calculated between a pixel of the current image block and a corresponding pixel of the generic prediction image block;
    associating a respective second quantized value with each of said second pixel-by-pixel differences; and
    performing a combination of the second quantized values so as to obtain a third cumulated value representing said difference between the current image block being processed and the generic prediction image block,
wherein said associating a respective second quantized value is performed such that a contribution of a first group of the second pixel-by-pixel differences to a fourth cumulated value, obtainable by performing said combination on the values of said second pixel-by-pixel differences, is higher than a contribution of a corresponding first group of second quantized values to said third cumulated value, wherein said second pixel-by-pixel differences of the first group have an absolute value lower than a third threshold.

12. The method according to claim 11, wherein said associating a respective second quantized value comprises associating with at least said first group of second pixel-by-pixel differences respective second quantized values lower, in absolute value, than said second pixel-by-pixel differences of the first group.

13. The method according to claim 12, wherein said associating with at least said first group of second pixel-by-pixel differences respective second quantized values lower in absolute value comprises associating with each second pixel-by-pixel difference of said first group a respective second quantized value equal to zero.

14. The method according to claim 13, wherein said associating with each second pixel-by-pixel difference of said first group a respective second quantized value equal to zero comprises truncating to a prescribed number of digits a numeric code representing the respective second pixel-by-pixel difference absolute value.

15. The method according to claim 14, wherein said associating with each second pixel-by-pixel difference of said first group a respective second quantized value equal to zero further comprises, before truncating, multiplying the respective second pixel-by-pixel difference absolute value by a predetermined constant value.

16. The method according to claim 11, wherein said associating a respective second quantized value comprises associating with a second group of second pixel-by-pixel differences, having an absolute value higher than or equal to the third threshold, respective second quantized values being higher, in absolute value, than said second pixel-by-pixel differences of the second group.

17. The method according to claim 11, wherein said associating a respective second quantized value comprises raising each of the second pixel-by-pixel differences to an even exponent, or squaring them.

18. The method according to claim 9, wherein said electing one among the determined prediction image blocks comprises choosing the prediction image block having the lowest third cumulated absolute value.

19. The method according to claim 1, wherein said skip-mode prediction block comprises a portion of an already processed image.

20. The method according to claim 1, wherein said performing a combination of the quantized values so as to obtain a cumulated value comprises summing absolute values of said quantized values.

21. A digital image encoder, comprising:
    an image block extractor adapted to extract, from at least a portion of an image to be encoded, image blocks formed by a plurality of pixels; and
    an image block processor adapted to process each image block of the image, said image block processor comprising:
        a skip-mode predictor calculator adapted to determine a skip-mode prediction block in respect of the image block being processed;
        a first block-difference calculator adapted to calculate a difference between the image block being processed and the skip-mode prediction block;
        a comparator adapted to compare the calculated difference between the image block being processed and the skip-mode prediction block to a predetermined first threshold;
        an image-block predictor calculator adapted to calculate prediction image blocks in respect of the image block being processed;
        a predictor selector adapted to elect one among the prediction image blocks; and
        an image block encoder adapted to coding a difference between the image block being processed and the elected prediction image block,
    wherein at least one among said image-block predictor calculator, predictor selector, and image block encoder are adapted to be activated conditioned to a first output of said comparator, and
    wherein said first block-difference calculator comprises:
        a first pixel-by-pixel difference calculator adapted to calculate a plurality of pixel-by-pixel differences between pixels of the current image block and corresponding pixels of the skip-mode prediction image block;

a first pixel-by-pixel difference processor adapted to associate a respective quantized value with each of said pixel-by-pixel differences; and a first cumulating processor adapted to perform a combination of the quantized values so as to obtain a cumulated value representing said difference between the current image block being processed and the skip-mode prediction block, wherein the association of a respective quantized value is performed by said first pixel-by-pixel difference processor such that a contribution of a first group of pixel-by-pixel differences to a second cumulated value, obtainable by performing said combination on the values of said pixel-by-pixel differences, is higher than a contribution of a corresponding first group of quantized values to said cumulated value, wherein said pixel-by-pixel differences of the first group have an absolute value lower than a second threshold.

22. The digital image encoder according to claim 21, wherein said image block encoder is also adapted to skip said coding, conditioned to a second output of said comparator.

23. The digital image encoder according to claim 21, wherein said first pixel-by-pixel difference processor is adapted to associate with at least said first group of pixel-by-pixel differences respective quantized values being lower, in absolute value, than said pixel-by-pixel differences of the first group.

24. The digital image encoder according to claim 23, wherein said first pixel-by-pixel difference processor is adapted to associate with each of said at least said first group of pixel-by-pixel differences a respective quantized value equal to zero.

25. The digital image encoder according to claim 24, wherein said first pixel-by-pixel difference processor is adapted to truncate to a prescribed number of digits a second numeric code representing the respective pixel-by-pixel difference absolute value.

26. The digital image encoder according to claim 25, wherein said first pixel-by-pixel difference processor is also adapted to multiply, before truncating, the respective pixel-by-pixel difference absolute value by a predetermined second constant value.

27. The digital image encoder according to claim 21, wherein said first pixel-by-pixel difference processor is adapted to associate with a second group of pixel-by-pixel differences, having an absolute value higher than or equal to the second threshold, respective quantized values higher, in absolute value, than said pixel-by-pixel differences of the second group.

28. The digital image encoder according to claim 21, wherein said first pixel-by-pixel difference processor is adapted to raise each of the pixel-by-pixel differences to an even exponent, or the square.

29. The digital image encoder according to claim 21, further comprising a second block-difference calculator adapted to calculate a difference between the image block being processed and each of the prediction image blocks.

30. The digital image encoder according to claim 29, wherein said second block-difference calculator comprises:

a second pixel-by-pixel difference calculator adapted to calculate a plurality of second pixel-by-pixel differences, wherein each of said second pixel-by-pixel differences is calculated between a pixel of the image block being processed and a corresponding pixel of a generic prediction image block;

a second pixel-by-pixel difference processor adapted to process said second pixel-by-pixel differences so as to obtain a respective plurality of processed second pixel-by-pixel difference values; and a second cumulating processor adapted to combine said processed second pixel-by-pixel difference values so as to obtain a third cumulated value, representing the difference between the image block being processed and the generic prediction image block.

31. The digital image encoder according to claim 29, wherein said second block-difference calculator comprises:

a second pixel-by-pixel difference calculator adapted to calculate a plurality of second pixel-by-pixel differences, wherein each of said second pixel-by-pixel differences is calculated between a pixel of the image block being processed and a corresponding pixel of a generic prediction image block;

a second pixel-by-pixel difference processor adapted to associate a respective second quantized value with each of said second pixel-by-pixel differences; and a second cumulating processor adapted to perform a combination of the second quantized values so as to obtain a third cumulated value representing said difference between the image block being processed and the generic prediction image block, wherein the association of a respective quantized value is performed by said second pixel-by-pixel difference processor such that a contribution of a first group of the second pixel-by-pixel differences to a fourth cumulated value, obtainable by performing said combination on the values of said second pixel-by-pixel differences, is higher than a contribution of a corresponding first group of second quantized values to said third cumulated value, wherein said second pixel-by-pixel differences of the first group have an absolute value lower than a third threshold.

32. The digital image encoder according to claim 31, wherein said second pixel-by-pixel difference processor is adapted to associate with at least said first group of second pixel-by-pixel differences respective second quantized values lower, in absolute value, than said second pixel-by-pixel differences of the first group.

33. The digital image encoder according to claim 32, wherein said second pixel-by-pixel difference processor is adapted to associate with each second pixel-by-pixel difference of said first group a respective second quantized value equal to zero.

34. The digital image encoder according to claim 33, wherein said second pixel-by-pixel difference processor is adapted to truncate to a prescribed number of digits a second numeric code representing the respective second pixel-by-pixel difference absolute value.

35. The digital image encoder according to claim 34, wherein said second pixel-by-pixel difference processor is also adapted to multiply, before truncating, the respective second pixel-by-pixel difference absolute value by a predetermined second constant value.

36. The digital image encoder according to claim 31, wherein said second pixel-by-pixel difference processor is adapted to associate with a second group of second pixel-by-pixel differences, having an absolute value higher than or equal to the second threshold, respective quantized values being higher, in absolute value, than said second pixel-by-pixel differences of the second group.

37. The digital image encoder according to claim 31, wherein said second pixel-by-pixel difference processor is adapted to associate a respective second quantized value comprises raising each of the second pixel-by-pixel differences to an even exponent, or squaring them.

38. The digital image encoder according to claim 29, wherein said predictor selector is adapted to choose the prediction image block having the lowest third cumulated absolute value.

39. The digital image encoder according to claim 21, wherein said skip-mode prediction block comprises a portion of an already processed image.

40. The digital image encoder according to claim 21, wherein said first cumulating processor comprises an adder adapted to sum absolute values of said quantized values.

41. A communication terminal, or a videotelephone, comprising the digital image encoder according to claim 21.

* * * * *